US011829275B2

(12) United States Patent
Arechiga Gonzalez et al.

(10) Patent No.: US 11,829,275 B2
(45) Date of Patent: Nov. 28, 2023

(54) SYSTEMS AND METHODS FOR AUTOMATIC TEST GENERATION

(71) Applicants: TOYOTA RESEARCH INSTITUTE, INC.; THE BOARD OF TRUSTEES OF THE LELAND STANFORD JUNIOR UNIVERSITY, Stanford, CA (US)

(72) Inventors: Nikos Arechiga Gonzalez, San Mateo, CA (US); Karen Y. Leung, Mountain View, CA (US); Marco Pavone, Palo Alto, CA (US)

(73) Assignees: TOYOTA RESEARCH INSTITUTE, INC., Los Altos, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 660 days.

(21) Appl. No.: 16/570,654

(22) Filed: Sep. 13, 2019

(65) Prior Publication Data

US 2020/0125472 A1    Apr. 23, 2020

Related U.S. Application Data

(60) Provisional application No. 62/746,700, filed on Oct. 17, 2018.

(51) Int. Cl.
*G06F 11/34* (2006.01)
(52) U.S. Cl.
CPC ............... *G06F 11/3461* (2013.01)
(58) Field of Classification Search
CPC ............ G06F 11/3461; G01M 17/007
See application file for complete search history.

(56) References Cited

U.S. PATENT DOCUMENTS 9,720,410 B2   8/2017   Fairfield et al.
2017/0286570 A1  10/2017   Kim et al.

FOREIGN PATENT DOCUMENTS

CN   104570765 B   5/2017
WO   2017079229 A1  5/2017

OTHER PUBLICATIONS

Tuncali et al. "Utilizing S-TaLiRo as an Automatic Test Generation Framework for Autonomous Vehicles" 2016 IEEE 19th International Conference on Intelligent Transportation Systems (ITSC), Windsor Oceanico Hotel, Rio de Janeiro, Brazil (Nov. 2016) [retrieved on Mar. 7, 2022] (Year: 2016).*

(Continued)

*Primary Examiner* — Rehana Perveen
*Assistant Examiner* — Alfred H B Wechselberger
(74) *Attorney, Agent, or Firm* — SEYFARTH SHAW LLP

(57) ABSTRACT

Systems and methods for generating and evaluating driving scenarios with varying difficulty levels is provided. The disclosed systems and methods may be used to develop a suite of regression tests that track the progress of an autonomous driving stack. A robustness trace of a temporal logic formula may be computed from an always-eventually fragment using a computation graph. The robustness trace may be approximated by a smoothly differentiable computation graph, which can be implemented in existing machine learning programming frameworks. The systems and methods provided herein may be useful in automatic test case generation for autonomous or semi-autonomous vehicles.

18 Claims, 7 Drawing Sheets

(56) References Cited

OTHER PUBLICATIONS

Jha et al. "TeLEX: Passive STL Learning Using Only Positive Examples" S. Lahiri and G. Reger (Eds.): RV 2017, LNCS 10548, pp. 208-224, 2017 (First Online: Sep. 2017); DOI: 10.1007/978-3-319-67531-2_13 [retrieved on Mar. 7, 2022] (Year: 2017).*

Vazquez-Chanlatte et al. "Logical Clustering and Learning for Time-Series Data" arXiv:1612.07823v3 [cs. LG] (Online: May 2017) [ retrieved on Mar. 25, 2022] (Year: 2017).*

Maler et al. "Monitoring Temporal Properties of Continuous Signals" Y. Lakhnech and S. Yovine (Eds.): Formats/FTRTFT 2004, LNCS 3253, pp. 152-166 [retrieved on Mar. 6, 2022] (Year: 2004).*

Maclaurin, D. "Modeling, Inference and Optimization with Composable Differentiable Procedures" [Thesis] Department of Physics, Harvard University, pp. 13-18 (Apr. 2016) [retrieved on Mar. 7, 2022] Retrieved from <https://dash.harvard.edu/handle/1/33493599> (Year: 2016).*

O'Kelly et al. "Computer-Aided Design for Safe Autonomous Vehicles" 2017 Resilience Week (RWS). IEEE, 2017 (Online Oct. 30, 2017) [retrieved Mar. 25, 2022] (Year: 2017).*

Asarin et al. "Parametric Identification of Temporal Properties" "Parametric identification of temporal properties." International Conference on Runtime Verification. Springer, Berlin, Heidelberg, 2011 [retrieved on Mar. 25, 2022] (Year: 2011).*

Nenzi et al. "A Robust Genetic Algorithm for Learning Temporal Specifications from Data" A. McIver and A. Horvath (Eds.): QEST 2018, LNCS 11024, pp. 323-338, 2018; https://doi.org/10.1007/978-3-319-99154-2_20 (Online Aug. 2018) [retrieved on Mar. 25, 2022] (Year: 2018).*

"Susmitjha/Telex" [Code repository] stl.py lines 1-18 [retrieved on Sep. 28, 2022] Retrieved from << https://github.com/susmitjha/TeLEX/blob/89cd49cfa622ad055108ebdb5fd947ec56698426/telex/stl.py>> (Year: 2017).*

Sheng et al. "A Case Study of Trust on Autonomous Driving" arXiv:1904.11007v2 [cs.HC] (Available Jul. 18, 2019) [retrieved on Sep. 28, 2022] (Year: 2019).*

Sadigh et al. "Planning for cars that coordinate with people: leveraging effects on human actions for planning and active information gathering over human internal state" Autonomous Robots, vol. 42, pp. 405-1426; https://doi.org/10.1007/s10514-018-9746-1 [ retrieved on Oct. 3, 2022] (Year: 2018).*

Tuncali, Cumhur Erkan, et al., "Simulation-based Adversarial Test Generation for Autonomous Vehicles with Machine Learning Components", 29th IEEE Intelligent Vehicles Symposium, May 18, 2018, pp. 1-18.

Althoff, et al., "Model-Based Probabilistic Collision Detection in Autonomous Driving", IEEE Transactions on Intelligent Transportation Systems, 2009.

Althoff, et al., "Comparison of Markov Chain Abstraction and Monte Carlo Simulation for the Safety Assessment of Autonomous Cars", IEEE International Conference on Intelligent Transportation Systems, 2011.

Bakhirkin, et al., "Efficient Parametric Identification for STL", Hybrid Systems: Computation and Control 2018.

Broadhurst, et al., "Monte Carlo Road Safety Reasoning", IEEE Intelligent Vehicles Symposium, 2005.

Eidehall, et al., "Statistical Threat Assessment for General Road Scenes Using Monte Carlo Sampling", IEEE International Conference on Intelligent Transportation Systems.

Li, et al., "Predicting motor vehicle crashes using support vector models", Journal of Accident Analysis and Prevention, 2008.

J. Pearl, "Causal Inference in Statistics: An Overview", Journal of Statistics Surveys, 2009.

Schreir, et al., "Bayesian, maneuver-based, long-term trajectory prediction and criticality assessment for driver assistance systems", IEEE International Conference on Intelligent Transportation Systems, 2014.

Strickland, et al., "Deep Predictive Models for Collision Risk Assessment in Autonomous Driving", International Conference on Robotics and Automation, 2018.

Wheeler, et al., "Factor Graph Scene Distributions for Automotive Safety Analysis", IEEE International Conference on Intelligent Transportation Systems, 2016.

Wulfe, et al., "Real-time prediction of intermediate-horizon automotive collision risk", International Conference on Autonomous Agents and Multiagent Systems.

* cited by examiner

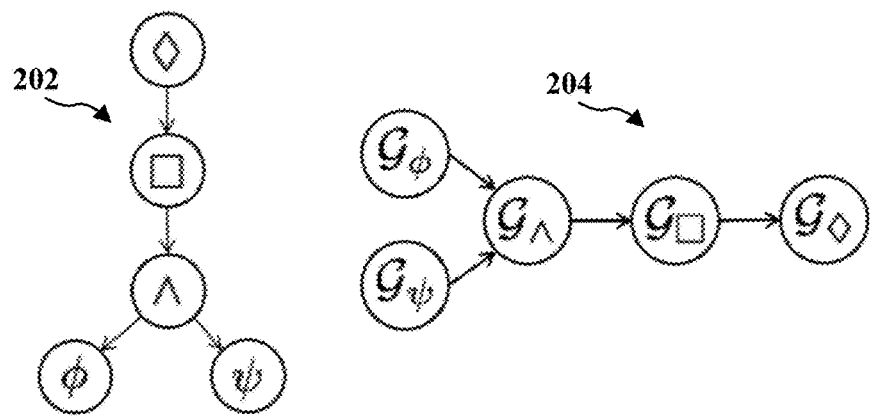
FIG. 2
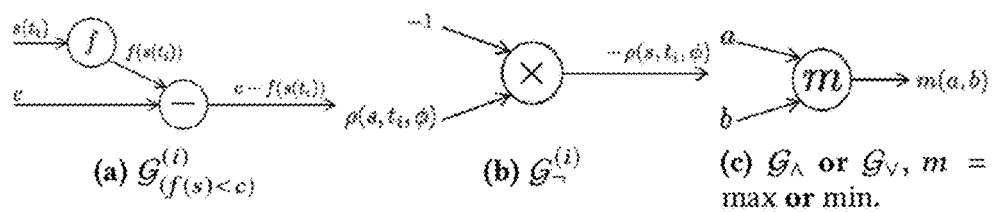
FIG. 3(a)  FIG. 3(b)  FIG. 3(c)
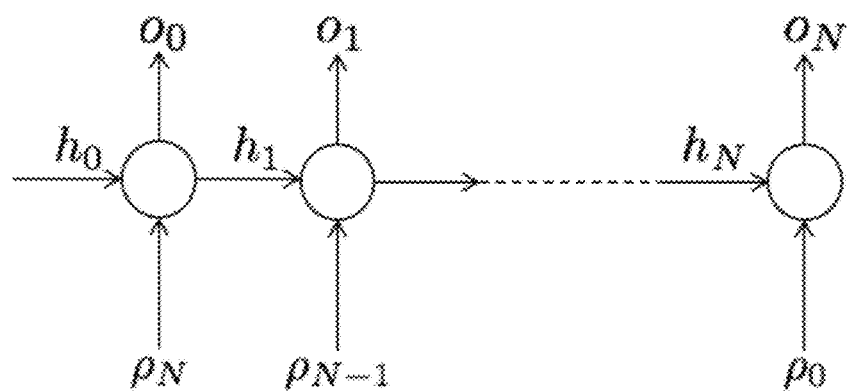
FIG. 4

(a) Front *ttc* parameters.

(b) Rear *ttc* parameters

SYSTEMS AND METHODS FOR AUTOMATIC TEST GENERATION

CROSS-REFERENCE TO RELATED APPLICATION

This application claims priority to U.S. Provisional Application No. 62/746,700, filed on Oct. 17, 2018, the contents of which are hereby incorporated by reference in its entirety.

FIELD OF TECHNOLOGY

Aspects of the present disclosure relate to simulation data and test case generation, more particularly to systems and methods for translating signal temporal logic formulas into computation graphs, for use in complex machine learning.

BACKGROUND

The "rules of the road" govern how people behave while driving. High-level behaviors may often be described using rule-based or logic-based techniques. This technique, however, depends on domain knowledge, and not all the rules are always met as there is a spectrum in how individuals may obey these rules. For example, some drivers tend to tailgate, while others maintain a three-second gap.

Signal Temporal Logic (STL) is an expressive language to describe signals, both continuous and discrete. STL has been adopted as a specification language for discrete, continuous, and hybrid systems, including robots and autonomous vehicles. More recently, STL formulas have been used for clustering and classification of time-varying traces, providing an explainable form machine learning. However, prior systems and methods rely on computationally expensive algorithms that can only handle monotonic STL formulas, i.e. formulas that become monotonically more true or less true as a parameter is varied.

SUMMARY

Aspects of the present disclosure provide a testing strategy for autonomous vehicles that make use of rule-based domain knowledge. A modeling language is provided that offers rigidity with regards to the rule-based nature of driving, but also some flexibility to describe the spectrum in which these rules may be followed. Aspects of the present disclosure further provide systems and methods for generating driving scenarios with varying difficult levels in order to develop a suite of regression tests that track the progress of an autonomous driving stack. In order to certify the safety of a cyber-physical system, the system must be strenuously stress-tested in a diverse range of scenarios to ensure the system is certifiably safe and robust, i.e., failure occurs within some $\epsilon$-probability. According to aspects of the disclosure a robustness trace of a temporal logic formula may be computed from an always-eventually fragment using a computation graph. By using a relaxation, the robustness trace may be approximated by a smoothly differentiable computation graph, which can be implemented in existing machine learning programming frameworks. The systems and methods provided herein may be useful automatic test case generation for autonomous or semi-autonomous vehicles.

According to one aspect of the present disclosure, a method of evaluating a test case is provided. The method may include receiving a timed trace input and generating a parametric signal temporal logic formula representative of a driving scenario. The parametric temporal logic formula may be solved for at least one parameter, wherein the value of the at least one parameter provides an optimal description of the timed trace. The test case may be evaluated using the value of the at least one parameter.

According to another aspect of the present disclosure, a system for evaluating a testing scenario is provided. The system may include a memory and at least one processor coupled to the memory. The processor may be configured to receive a timed trace input, generate a parametric signal temporal logic formula representative of a driving scenario, and solve the parametric temporal logic formula for at least one parameter, wherein the value of the at least one parameter provides an optimal description of the timed trace. The processor may further be configured to evaluate the test case using the value of the at least one parameter.

According to another aspect of the present disclosure, a non-transitory computer-readable medium having program code recorded thereon for evaluating a testing scenario is provided. The program code may be executed by a processor and comprise program code to receive a timed trace input, program code to generate a parametric signal temporal logic formula representative of a driving scenario, and program code to solve the parametric temporal logic formula for at least one parameter, wherein the value of the at least one parameter provides an optimal description of the timed trace. The non-transitory computer-readable medium may further include program code to evaluate the test case using the value of the at least one parameter.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 2 depicts a parse tree and a computation graph according to an aspect of the present disclosure.

FIGS. 3(a)-(c) depict computation graph representations of the robustness function for predicate and Boolean connectives according to an aspect of the present disclosure.

FIG. 4 depicts a computation graph for a recurrent network for computing the robustness of signal temporal logic formulas according to an aspect of the present disclosure.

DETAILED DESCRIPTION

Figure 1A:
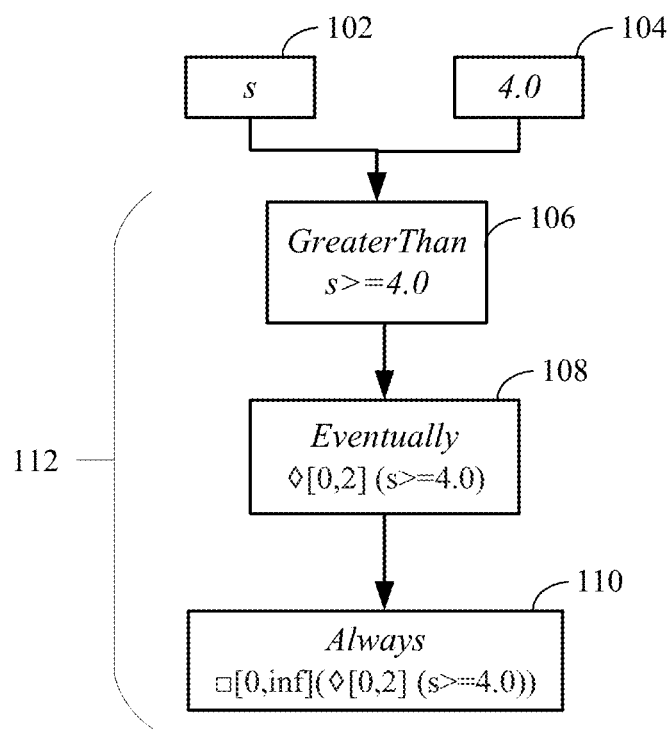
FIG. 1(a) depicts a graphical representation of an STL formula according to an aspect of the present disclosure.

The present disclosure generally relates to systems and methods for generating driving scenarios by computing robustness traces of signal temporal logic formulas using computation graphs. The robustness trace may be approximated by a smoothly differentiable computation graph, which may be implemented in a machine-learning framework, particularly one suited for autonomous or semi-autonomous driving scenarios.

According to an aspect of the present disclosure, a method for constructing a computation graph to evaluate the robustness of an STL formula is presented. The computation graph may be equivalent to directly computing the robustness recursively. According to another aspect, differentiable approximations may be made to the robustness formulas to show that a parametric STL (pSTL) problem may be efficiently solved using backpropagation on the computation graph. According to another aspect, the method may be implemented in a system and used to investigate driving scenarios, such as a lane-changing or merging, for systematic scenario-based testing for autonomous driving. The disclosed systems and methods may be used to efficiently learn pSTL parameters, use them to gain interpretability into the system, and synthesize this information to generate new and more challenging test scenarios in order to improve the testing and validation of safety-critical systems.

Formal methods are a mathematically rigorous, logic-based techniques used for specification, design and verification of software and hardware systems. They provide a means to symbolically examine a system and establish correctness or safety properties. In particular, STL is an expressive specification language that can describe properties of both discrete-time and real-valued dense-time signals. This capability makes it a versatile specification language for cyber-physical systems. In addition to Boolean semantics, STL is equipped with quantitative semantics. STL can provide a robustness value—a continuous real-valued scalar that represents the degree of satisfaction over the specification. Recently, STL has gained popularity because it can be applied to continuous and hybrid dynamics, and be used to describe long-term behaviors of those systems. For example, STL has been used as constraints in model predictive control and stochastic control problems, and to describe long-term goals in reinforcement learning.

The inverse problem, i.e., constructing an STL specification given a signal, presents an interesting yet challenging problem. It is interesting because learning STL formulas from complex time-series data can offer valuable insight and interpretability into the structure and properties of the system. It may also potentially improve other methods that rely on the signal, such as classification, prediction, and decision-making. Constructing and STL specification from a signal, however, may be challenging because the space of STL formulas is infinitely large and the solution is not unique. Previous systems propose methods to mine STL specifications from time-series data and use it for classification and prediction. For computational tractability, however, those methods limit the class of formulas that can be used. One common approach is parametric STL (pSTL). A pSTL formula is a template STL formula, and given time series data, it may be possible to optimize the formula over the parameters to find the values that provide the tightest fit in terms of robustness. This parameter identification can be thought as a form of feature extraction from time series data. A key drawback of existing techniques, however, is that they only support monotonic formulas, i.e. formulas whose satisfaction depends monotonically on the parameters.

Aspects of the present disclosure present a system and method that uses computation graphs and smooth differentiable approximations to tractably and efficiently learn parameters of complex, possibly non-monotonic, pSTL formulas that contain 'Always' and 'Eventually' temporal operators. By using computation graphs, state-of-the-art machine learning computation tools may be leveraged. These state-of-the-art machine learning tools provide auto-differentiation, which allows the system to efficiently learn the parameters of a pSTL formula. In addition, these tools afford various other computational advantages, such as ease of parallelization and fast optimization routines.

Another popular research field is machine learning, and more recently, deep learning. Machine learning has been very successful in many domains, such as natural language processing, computer vision, and end-to-end learning for robotic systems. To accommodate this surge, there has been industrial efforts in developing very efficient computational infrastructure (e.g., PyTorch and Tensorflow) for machine learning techniques. Since deep learning algorithms rely on large-scale computation graphs and backpropagation, these tools are in fact a very general and highly optimized tool for building arbitrarily complex computation graphs. Representing STL robustness formulas as computation graphs takes advantage of the benefits of using state-of-the-art machine learning tools.

A major drawback in many deep learning algorithms however, especially those involving dense time-series data, is that the learned model is often extremely opaque and thus difficult to interpret. It is not obvious how to inject prior knowledge into the network in a grounded way, and it is challenging to properly encode desired long-term behaviors into an otherwise dense neural network. Deep learning has been used in many safety-critical systems (e.g., autonomous driving, computer vision, and manipulation) but due to its black-box nature, validating the safety of such systems is extremely difficult.

According to one aspect of the present disclosure, a system and method may translate STL formulas into computation graphs, i.e., the same "language" used by modern machine learning tools. The translation bridges the gap between STL, a type of formal method used for safety verification and model checking of time-series data, and deep learning, a very powerful function approximator that is used in many safety-critical systems. Aspects of the present disclosure incorporate logical structure within deep learning frameworks to build a powerful yet logically grounded model that is applicable to many domains.

As artificial intelligence (AI) systems are given more responsibilities in society, it is important to ensure that they are making decisions for the right reasons and be able to justify their actions. The current dominant class of deep learning AI algorithms are notoriously opaque. So much so, in fact, governments have requested and sought out solutions and techniques that can provide legal and ethical explanations, which are important for a wide range of safety-critical applications, including self-driving cars, military systems, and semi-automated warehouses.

For instance, deep learning has found success in the field of computer vision but many of the core techniques rely on extremely dense and opaque networks, making it difficult to justify the image classification result. Recent systems have been aimed at generating explanations for an object identification decision. For example, some prior systems aim to generate text and/or identify areas in an image as a form explanation. These methods however rely on a separate neural network to generate explanations, and are separate from the decision-maker itself.

Although these approaches help explain the classification result, it is not immediately apparent as to how this can be used to ensure safety for an AI system. Alternatively, in the field of controls and planning, Inverse Reinforcement Learning (IRL) is a machine learning technique that injects interpretability by learning a reward function that represents the system's incentives (e.g., human's preference). Although effective in learning the system's preference, is it highly biased by the choice of features. For larger and more complex systems, these features are often learned via neural networks and thus become uninterpretable.

Logical formulas, on the other hand, are a uniquely powerful tool for generating explanations that can be used as part of a justification and may be used for control synthesis to ensure the system satisfies the specification. Logical formulas may also be a lens for one to gain better insight into the problem at hand. The inverse problem, however, i.e., learning logical formulas from data, may also be extremely powerful as it offers insight into the structure and logical properties of an independent system. This may be a very challenging problem and often leads to intractability. Tractable methods may limit the class of learnable formulas.

A proxy for logical structure is to use decision trees, in the sense that logical predicates are tested for truth or falsehood at each node of the tree. Prior methods provide a differentiable formulation for decision trees that can be trained by backpropagation. Decision trees, however do not have an internal state, which means that they do not provide the same dynamic richness as many temporal logic formulas (e.g., STL), which can express and monitor properties that evolve over time.

A middle ground between tractability and using the powerful capabilities of STL may be to use pSTL. Prior methods rely on algorithms that are restricted to monotonic formulas. Although monotonic formulas represent a broad class of STL methods, this requirement may be relaxed and a much broader framework for solving general pSTL problems may be developed.

Aspects of the present disclosure provide a computation graph representation of STL formulas and, using a relaxation, pSTL formulas may be optimized using machine learning training frameworks. In this way, the gap between the efficient trainability of classical machine learning algorithms and the argumentative strength of logical formulas may be bridged.

According to an aspect of the present disclosure, STL and its parametric extension, pSTL may be defined as the following:

Definition 1 (Timed Trace): A timed trace s may be an ordered finite sequence of states and their associated time, $s=(x_0, t_0), \ldots, (x_n, t_n)$ where $t_{i-1} < t_i$ and $x_i \in \mathbb{R}^n$. Further, the following notation made be used: $s(t_i)=x_i$.

Definition 2 (Timed Trace Subsequence). Given a timed trace s that starts at $t_0$, a timed trace subsequence of (s, $t_i$) is a timed trace starting at time $t_i$, $i \in \mathbb{N}_0$. That is, $$(s,t_i)=(x_i,t_i), \ldots ,(x_n,t_n)$$

Further, we use the following notation $s_i$ (s, $t_i$).

Additionally, the assumption is made that the time steps are uniformly spaced.

According to aspects of the present disclosure, temporal logic and its many variants for example, Linear Temporal Logic (LTL), Bounded Linear Temporal Logic (BLTL), Linear Temporal Logic over finite traces (LTLf), and Metric Temporal Logic (MTL), may be formalisms for reasoning about timed traces. They may be powerful tools to express specifications, and enable a wide array of assurance techniques, such as formal verification, falsification, model checking, and systematic testing. These logical languages may be used in many domains including robot motion planning and control, biological systems, and network planning. Specifically, STL, an extension to Linear Temporal Logic (LTL), is a specification language for real-valued signals and can be applied to many continuous and hybrids systems.

STL formulas may be defined over predicates of the form $f(s)<c$, where s is a timed trace (signal), $f: \mathbb{R}^n \to \mathbb{R}$ is a function and $c \in \mathbb{R}$. STL formulas are written using the following grammar:

$$I:=(a,b)|(a,b]|[a,b)|[a,b]$$

$$\phi:=\text{true}|f(s)<c|\neg\phi|\phi\wedge\psi|\phi\vee\psi|\Diamond_{I_\phi}|\Box_{I_\phi}|\phi U_{I_\psi}|\phi T_{I_\psi}$$

where $f(s)<c$ is a predicate, $\neg$ (negation/not), $\wedge$ (conjunction/and), and $\vee$ (disjunction/or) are Boolean connectives, and $\Diamond$ (eventually), $\Box$ (always), U (until) and T (then) are temporal operators. $f(s)<c$ may be achieved by applying a negation. The temporal operators may have an associated time interval I where $0 \leq a < b$. For ease of notation, I may be dropped from the grammar when $a=0$, $b=\infty$. Further the following assumption may be made:

Assumption 1. Without loss of generality, I may be only considered to be of the form [a, b] or [a, ∞] where $0 \leq a < b$. By the assumption that the time steps are uniformly spaced, if I does not include endpoints, the boundaries may be changed to the nearest inclusive time step.

Let (s, t) be a timed trace starting at time t. The Boolean semantics of STL may be defined recursively:

$$(s,t) \models f(s(t))<c \Leftrightarrow f(s(t))<c$$

$$(s,t) \models \neg\phi \Leftrightarrow \neg((s,t) \models \phi)$$

$$(s,t) \models \phi \wedge \psi \Leftrightarrow ((s,t) \models \phi) \wedge ((s,t) \models \psi)$$

$$(s,t) \models \phi \vee \psi \Leftrightarrow ((s,t) \models \phi) \vee ((s,t) \models \psi)$$

$$(s,t) \models \Diamond_{I_\phi} \Leftrightarrow \exists t' \in I \oplus t \text{ s.t.} (s,t') \models \phi$$

$$(s,t) \models \Box_\phi \Leftrightarrow \forall t' \in I \oplus t \text{ s.t.} (s,t') \models \phi$$

$$(s,t) \models \phi U_{I_\psi} \Leftrightarrow \exists t' \in I \oplus t \text{ s.t.} (s,t') \models \psi) \wedge ((s,t) \models \Box_{[0,t']} \phi)$$

$$(s,t) \models \phi T_{I_\psi} \Leftrightarrow \exists t' \in I \oplus t \text{ s.t.} (s,t') \models \psi) \wedge ((s,t) \models \Diamond_{[0,t']} \phi)$$

For a timed trace (s, t) starting at time t, satisfying $\square \phi$ means $\phi$ is always true for the entire sequence (since the I is dropped, I=[0, ∞)). While satisfying $\lozenge \phi$ means at some time along the sequence, $\phi$ is true at least once. Since STL specifications are defined recursively, temporal operators may be composed with each other. For example, a timed trace (s, t) satisfying $\lozenge \square_{[1,3]} \phi$ means that eventually $\phi$ will always be satisfied over the next 1-3 time units.

Since STL formulas are defined recursively, STL may be represented using a parse tree where each node represents an operation, and the leaves are the predicates. The order of operations for a formula $\phi$ may be denoted by $O_\phi$.

Definition 3 (STL Ordering): For an STL formula $\phi$, let PT be the parse tree of $\phi$. Define $O_\phi = \{\varphi_1, \varphi_2, \ldots \varphi_k\}$ as the post-order traversal of PT.

Example 1

Let $\phi = \lozenge_{I_1} (f(s) < c_1 \wedge g(s) < c_2) \vee \square_{I_2} h(s) < c_3$. Then $O_\phi = \{f(s) < c_1, g(s) < c_2, \wedge, \lozenge_{I_1}, h(s) < c_3, \square_{I_2}, \vee\}$.

A special property of STL is the notion of a robustness degree, a real value that describes how much a timed trace satisfies (or fails to satisfy) an STL specification. For example, if a signal does not satisfy an STL specification, the robustness degree will indicate the level of violation. This robustness metric may expand the utility of temporal logic in many continuous domains such as in problems pertaining to classification and prediction, optimal control, Hamiltonian-Jacobian reachability, and reinforcement learning.

The robustness degree can be calculated recursively according to the following quantitative semantics:

$\rho(s,t,\text{true}) = \rho_{max}$ $\rho(s,t,f(s) < c) = c - f(s(t))$ $\rho(s,t,\neg\phi) = -\rho(s,t,\phi)$ $\rho(s,t,\phi \wedge \psi) = \min(\rho(s,t,\phi), \rho(s,t,\psi))$ $\rho(s,t,\phi \vee \psi) = \min(\rho(s,t,\phi), \rho(s,t,\psi))$ $\rho(s,t, \lozenge_I \phi) = (\rho(s,t',\phi))$ $\rho(s,t, \square_I \phi) = (\rho(s,t',\phi))$ $\rho(s,t, \phi U_I \psi) = (\min(\rho(s,t',\psi), \rho(s,t'',\phi)))$ $\rho(s,t, \phi T_I \psi) = (\min(\rho(s,t',\psi), \rho(s,t'',\phi)))$ Further, there is no difference in using a strict, or non-strict inequality, as the robustness value does not change.

A robustness trace, according to one aspect of the disclosure may be defined:

Definition 4 (Robustness Trace): Given a timed trace s starting at time $t_0$ and an STL formula $\phi$, the robustness trace $\tau(s, t_0, \phi)$ is a sequence of robustness values for each subsequence $s_i$ of s. That is:

$\tau(s, t_0, \phi) = \tau_0, \tau_i, \ldots \tau_n$ $= \rho(s, t_0, \phi), \rho(s, t_1, \phi), \ldots, \rho(s, t_n, \phi)$ $= \rho(s_0, \phi), \rho(s_1, \phi), \ldots, \rho(s_n, \phi)$ Example 2

As an example of a computation graph, according to an aspect of the present disclosure, let s=(1, 0), (2, 0.1), (3, 0.2), (4, 0.3), (3, 0.4), (3, 0.5) and q=(1,0), (2, 0.1), (3, 0.2), (4, 0.3), (5, 0.4), (6, 0.5). Consider the specification $\phi = \lozenge \square_{[0,0.2]}(s > 4)$. For the timed trace s, $\phi$ is not satisfied since the signal never exceeds four, while q does satisfy $\phi$. For the robustness trace, $\tau(s,t,\phi) = -3, -2, -1, -1, -\rho_{max}, -\rho_{max}$ $\tau(q,t,\phi) = -3, -2, -1, 0, -\rho_{max}, -\rho_{max}$ FIG. 1(a) depicts a graphical representation of the STL formula $\phi$ from Example 1. s represents the timed trace input signal, 4.0 represents the STL parameter 104, and the blocks 106, 108 and 110 represent the STL operators.

When t⊕I is beyond the length of the timed trace, the robustness is equal to $-\rho_{max}$ because $\phi$ is not satisfied. Then the robustness may be computed by taking the max over the robustness trace $\rho(s, \phi) = -1$, $\rho(q, \phi) = 0$.

A natural extension to STL is parametric STL (pSTL). In pSTL, the specifications are introduced as parametric templates. Typically, the templates are proposed by a user and the goal is to fit parameter values given a timed trace. The mapping from a timed trace to parameter values is a form of feature extraction on varying-length time series data. Feature extraction from time-series data, particularly ones of varying length, is challenging due to the different time scales, and difficulty in defining a similarity metric. Traditional methods such as dynamic time warping and the closely related Skorokhod metric are useful, but may be inadequate in learning logical structure. Such methods may also be computationally intensive. After the feature extraction step, further analysis, such as clustering or regression, may be applied on the extracted feature space.

Let $\phi_P$ be a specification template with parameters P (e.g., $\phi_\alpha = f(s) < \alpha$). Given a timed trace s, a valuation v(P) may be sought such that $\phi_{v(P)}$ is the best description of s. This is equivalent to solving an optimization problem defined by:

$$v'(P) = \arg\min \rho(s,t,\phi)^2 \qquad \text{Eq. (1)}$$

A solution according to one aspect of the disclosure may include parameter values v(P) such that $\rho(s, t, \phi_{v(P)}) = 0$. However, since calculating the robustness of an STL specification involves recursively applying several max and min operations, solving Eq. (1) becomes a non-smooth, non-linear and non-convex problem. Standard optimization techniques such as gradient descent and genetic algorithms become ineffective because gradients are non-smooth, and the robustness is expensive to compute. While alternate solutions may exist, those solutions either rely on the formula being monotonic, which is not always the case, or they use a Monte-Carlo sampling or recursive technique which can be very expensive to compute.

Aspects of the present disclosure present a solution to the problem of developing a smoothly differentiable computation graph that computes the robustness trace of a pSTL formula that contains $\square$ (always) and $\lozenge$ (eventually) temporal operators. The set of logical formulas that contain only $\square$ (always) and $\lozenge$ (eventually) temporal operators are referred to herein as the always-eventually fragment of STL. Though not complete, this fragment is expressive, and contains many specifications of practical interest, including but not limited to the following:

(1) Safety: If $\phi$ is a logical formula that represents an unsafe condition, then $\square \neg \phi$ represents safety.

(2) Timely response: If $\phi$ is an event that the system must respond to with an action $\psi$ within some maximum interval I, the requirement on the system can be expressed as $\phi \diamond_I \psi$. Although the implication operator may not be explicitly included in the grammar, it may be easily written in terms of the other Boolean operators as $\neg \phi \vee \diamond_I \psi$.

(3) Stability: Suppose $\phi$ represents a target region of attraction. Then, stability of the system to this region can be written as $\diamond \square \phi$.

Aspects of the present disclosure include conversion of a computation graph into a smooth computation graph, such that it may be differentiated and its parameters learned through backpropagation. The present disclosure provides an approach to transforming the parse tree of an STL formula into a computation graph and further how the computation graphs can be smoothly approximated. According to one aspect of the disclosure, an application of such methods may be made to test-case generation for autonomous driving scenarios.

Figure 1B:
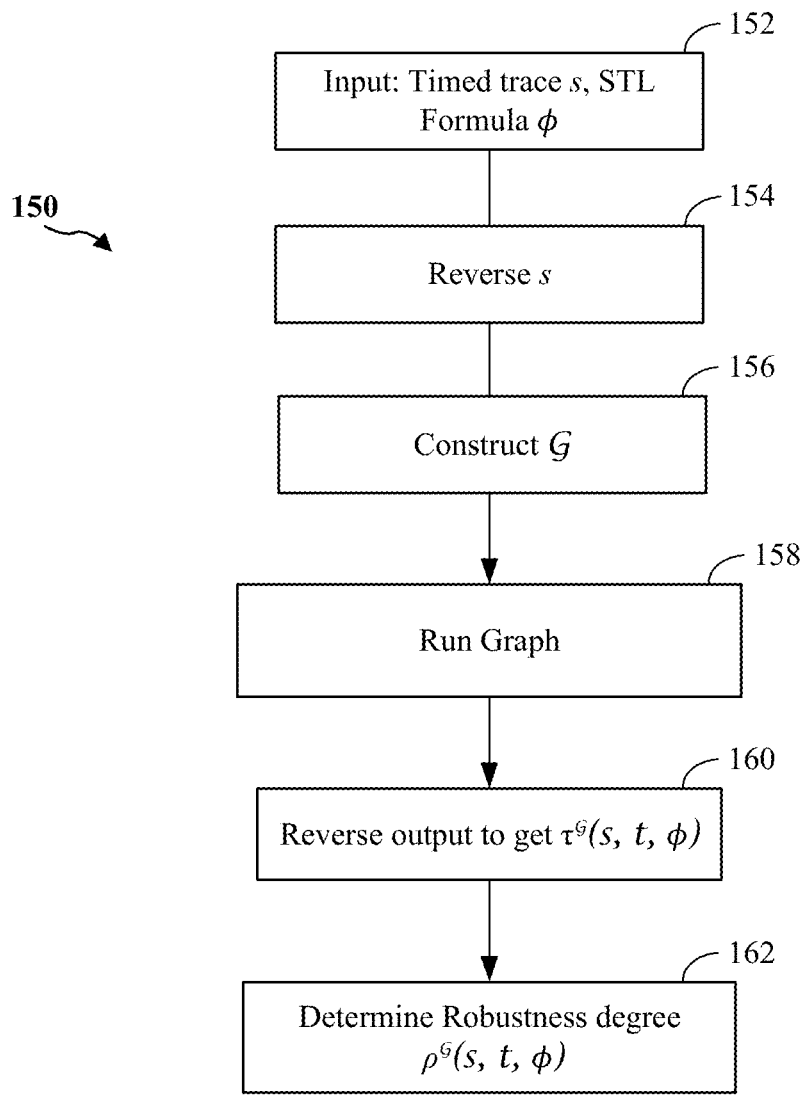
FIG. 1(b) depicts a flow diagram of a computation of robustness and robustness trace according to an aspect of the present disclosure.

Aspects of the present disclosure include systems and methods for constructing computation graph representations of robustness and robustness trace calculations for STL formulas. FIG. 1b depicts a high-level flow diagram 150 representative of one such method. As shown in block 152, a timed trace, s, and an STL formula $\phi$ may be provided as input to the system. As shown in block 154, the timed trace s may be reversed by reversing the order of elements in the trace. As shown in block 156, a computation graph G may be constructed, as further explained below, by combining $G_{\varphi_i}$, where $\varphi_i \in O_\phi$. According to one aspect, the inputs of $G_{\varphi_i}$ may only depend on outputs from $G_{\phi j}$, j>i. The overall graph may be combined by feeding the outputs of the graphs of the each subformula i into the graph of its parent formula j. As shown in block 158, the computation graph G may be run by feeding the reversed input sequence to the base of the computation graph and propagating through to the parent graphs, until it reaches the top-most output. The output of which, as shown in block 160, may be reversed to get a robustness trace, $\tau^G(s, t, \phi)$, by reversing the number of elements. From the robustness trace, a robustness degree, $\rho^G(s, t, \phi)$, may be determined by taking the first element of the robustness trace, as shown in block 162. This procedure will consistently produce a correct output.

By propagating backwards in time via recurrent computation graphs, the system may compute the robustness and the robustness trace simultaneously. This is particularly effective for formulas involving nested temporal operators. A computation graph representation, G, is presented for the predicate (f(s)<c), all the Boolean connectives (negation/not, conjunction/and, disjunction/or), and the eventually and always temporal operators. The soundness of the method may also be proven in such an approach. For the Until and Then operators, the second argument of the inner min operation may be $\square_{[t;t']}\phi$ and $\diamond_{[t;t']}\phi$, respectively. Thus the robustness trace may be computed for each term in the robustness formula and the appropriate max and min functions may be taken to obtain the robustness trace for the Until and Then operations.

The outputs of the temporal graph may be precisely the elements of the robustness trace but in reverse. This reversal is accounted for in the method of FIG. 1 (block 110). While the method of FIG. 1, as shown and described, outputs $\rho$ (s, t, $\phi$) (s; t;) and $\tau$ (s, t, $\phi$), since we are using a computation graph, the robustness and robustness trace of any subformula of $\phi$ may be as the graph is propagated.

To construct the computation graph, according to one aspect of the disclosure, the following definitions may be made:

Definition 5: (Valid Robustness Trace): C denotes a method for computing the robustness of an STL formula $\phi$, and $\tau^C(s, t, \phi)$ is t robustness trace of $\phi$ using method C. Then, $\tau^C(s, t, \phi)$ is a valid robustness trace for $\phi$ if $\tau^C(s, t, \phi) = \tau(s, t, \phi)$.

Definition 6: (Soundness): C is sound if it produces a valid robustness trace for all timed traces s and all STL formulas $\phi$.

According to one aspect of the disclosure, the computation graph G may be a directed acyclic graph made up of smaller computation graphs $G_{\varphi_k}$ that take a robustness trace of the subformula as inputs, and outputs the robustness trace after applying $\varphi_k$.

Since G is a directed acyclic graph, according to one aspect, where each subgraph is a "node", it may have a topological ordering. This topological ordering of G given $\phi$ may be precisely governed by $O_\phi$, the post-order traversal of the parse tree generated by $\phi$.

Example 3

As another example of a computation graph, according to an aspect of the present disclosure, let $\theta = \diamond \square(\phi \wedge \psi)$, then $O_\theta = \{\phi, \psi, \wedge, \square, \diamond\}$. FIG. 2 depicts a parse tree 202, $PT_\theta$, and computation graph 204, $G_\theta$. The computation graph 204, $G_\theta$, of the formula $\theta$ may be constructed by connecting the subgraphs whose nodes represent each operation. The topological ordering of $G_\theta$ may be the post-order traversal of the parse tree 202, $PT_\theta$, generated by $\phi$. Therefore, the topological ordering of $G_\theta$ may be $G_\phi$, $\{G_\psi, G_\wedge, G_\square, G_\diamond\}$.

FIGS. 3(a)-(c) illustrate graphs, according to an aspect of the present disclosure, representing the robustness at a particular time $t_i$, denoted by $G_\varphi^{(i)}$, of the predicate, (f(s)<c) (FIG. 3(a)), and Boolean connectives: negation/not (FIG. 3(b)); conjunction/and, disjunction/or (FIG. 3(c)). Computing the robustness of these operators may rely only on elementary operations, such as addition, subtraction, comparisons (e.g., "less than or equal", "greater than", or the like) and computing the maximum or minimum of a set of numbers. Constructing $G_\varphi^{(i)}$ may be performed on a case-by-case basis, depending on the logical formula, as described herein.

To compute the robustness trace, i.e., construct the graph, $G_\varphi$, $G_\varphi^{(i)}$ may be repeated over the timed trace. Using recurrent neural networks and their ability to effectively process sequential data, a recurrent computation graph model may be used to compute the robustness, and robustness trace of the $\diamond$ (eventually) and $\square$ (always) operators.

Suppose $\psi = \bigcirc_I \phi$, where $\bigcirc$ represents either $\diamond$ (eventually) or $\square$ (always). The graphical model for $G_\bigcirc$ is depicted in FIG. 4 as a recurrent network for computing robustness of STL formulas with the temporal operations $\diamond$ (eventually) or $\square$ (always). $G_\bigcirc$ takes a robustness trace of length N+1 as an input, and outputs a robustness trace after applying the $\bigcirc$ operator. With imprecise notation, $\rho_i$ may represent $\rho$(s, $t_i$, $\phi$), $h_i$ may represent the hidden state, and $o_i$ may represent the output at each cell i. Since I describes future times (i.e., 0≤a<b) from the given current time t, there is a need to propagate backwards in time in order for the computation graph to have knowledge about the values at t⊕I. For ease of notation, the backwards sequence may be defined as $\tilde{\rho}$, i.e., $\tilde{\rho}_N = \rho_0, \ldots \tilde{\rho}_i = \rho_{N-1}, \ldots \tilde{\rho}_0 = \rho_N$.

If $\bigcirc = \diamond$, then $h_0 = -\rho_{max}$ and m=max; otherwise if $\bigcirc = \square$, $h_0 = \rho_{max}$ and m=min. The computation graph for the m operator is given in FIG. 3(c), but adjusted to accept more inputs. For each computation node (cell), the following equations may be applied:

Case 1: I=[0, ∞)

$$o = h_i = m(\tilde{p}_i, h_i, h_{i+1}) = o_i$$

Case 2: I=[a, ∞), a>0. The start of s may be truncated to obtain Case 1.

Case 3: I=[0, b], b<∞. Let m be the number of samples from s that lie in (0,b]. Then $h_i \in R^m$, $h_i=[h_{i_1}, h_{i_2}, \ldots h_{i_m}]$, $h_0$ is a vector of $\pm \rho_{max}$ instead of a scalar, and $$o_i = m(\tilde{p}_i, h_i), h_{i+1} = [h_{i_2}, \ldots h_{i_m}, \tilde{p}_i]$$

Case 4: I=[a, b], b<∞. Let m be the number of samples from s that lie in (0, b], and k be the number of samples from s that lie in I. Then $h_i \in R^m$, $h_i=[h_{i_1}, h_{i_2}, \ldots h_{i_m}]$ is a vector of $\pm \rho_{max}$ instead of a scalar, and $$o_i = m(h_{i_{m-k+1}}, \ldots h_{i_m}), h_{i+1} = [h_{i_2}, \ldots h_{i_m}, \tilde{p}_i]$$

Equivalently, we can truncate the start of s to obtain Case 3.

For both Case 3 and 4, $h_i$ may be a vector of all the robustness values at each time step, t' ∈ t⊕I, excluding the value at the current time for that cell i. Then the $h_{i+1}$ update may be a shift of the vector in time by one step, removing the oldest value, and updating the newest values with the current value $\tilde{\rho}_i$.

Example 4

Figure 5:
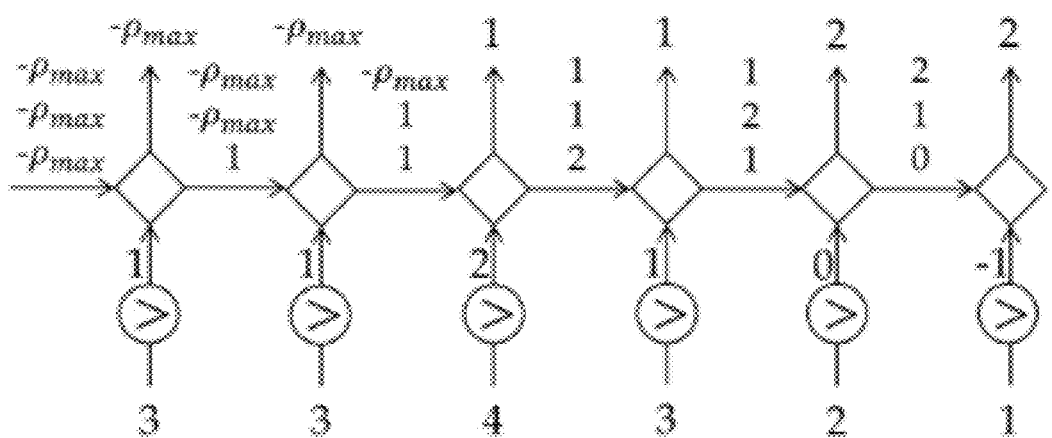
FIG. 5 depicts a computation graph according to an aspect of the present disclosure.

As another example of a computation graph, according to an aspect of the present disclosure, Let $\phi = \diamond_{[0.2,0.3]} s > 2$. Using s=(1,0), (2, 0.1), (3, 0.2), (4, 0.3), (3, 0.4), (3, 0.5) from Example 2 above, the computation graph $G_\phi$ is depicted in FIG. 5. The diamond node represents the ◇ (eventually) operator and uses the max operation. As shown, the outputs give the reversed robustness trace, and ρ(s, t, φ)=2 is the last output.

Given the details and construction of G described above, the soundness of the sequence $\tau^G$ (s, t, φ) may be proposed as the equivalent to the robustness trace τ (s, t, φ). Such a proposition may be proven by structural induction on φ. As a base case, it may be shown that $\tau^G$ (s, t, f (s(t))<c) is the same as τ (s, t, f (s(t))<c). By construction (see FIG. 3(a)), $\rho^G$ (s, t, f (s(t))<c)=c−f (s(t))=ρ(s, t, f (s(t))<c). Thus, $\tau^G$ (s, t, f (s(t))<c)=τ(s, t, f (s(t))<c).

For the induction step, it may be assumed that $\tau^G$(s, t, φ) and $\tau^G$ (s, t, ψ) are valid robustness traces for φ and ψ respectively. This means it may be assumed that $\rho^G$ (s, $t_i$, φ)=ρ(s, $t_i$, φ) and $\rho^G$ (s,t,ψ)=ρ(s, $t_i$, ψ). It is needed to show that $\tau^G$(s, t, φ∧ψ), $\tau^G$(s, t, φ∨ψ), $\tau^G$(s,t, ¬, φ), $\tau^G$(s,t, ◇ φ) and $\tau^G$ (s, t, ◇ φ) are all valid robustness traces. Showing the cases for ∧, ∨ and ¬ follows naturally from the construction of their computation graphs. For clarity and brevity, only the proof for ∨ is given:

$$\rho^G(s, t_i, \phi \wedge \psi) =$$
$$\min(\rho^G(s, t_i, \phi), \rho^G(s, t_i, \psi)) = \min(\rho(s, t_i, \phi), \rho(s, t_i, \psi)) = \rho(s, t_i, \phi \wedge \psi).$$

While only the proof for ∨ is given above, one skilled in the art will recognize that the proofs for the cases for ∧ and ¬ follow similarly.

For ○=◇ or □, by construction, $\rho^G$ (s, $t_i$, ○φ)=$o_{n-i}$, since the timed trace is fed backwards in time through the network, $o_i$ depends on information in the future only, i.e., it is computed using the subsequence at $t_{N-i}$. Again, by construction on $o_i$ and $h_i$, for all the different cases for I described above:

$$o_{N-1} = \underset{k \in t_i \oplus I}{m} \rho(s, t_k, \phi)$$
$$= \rho(s, t_i, \bigcirc)$$
$$\therefore \rho^G(s, t_i, \bigcirc) \rho(s, t_i, \bigcirc)$$

To prove for U (which follows to T, first a sequence from $t_0$ to $t_i$ may be defined as (s, $t_{-i}$). As it has been proven that other operators may all have valid robustness traces, and by construction:

$$\rho^G(s, t, \phi U_I \psi) = \max_{i \in t \oplus I}\left(\min\left(\rho^G(s, t, \psi), \min_{i' \in [0,i]} \rho^G(s, t_{i'}, \phi)\right)\right)$$
$$= \max_{i \in t \oplus I}(\min(\rho^G(s, t, \psi), \rho^G(s, t_{-i}, \Box \phi)))$$
$$= \max_{i \in t \oplus I}(\min(\rho^G(s, t, (\rho^G(s, t_i, \psi) \wedge \rho^G(s, t_{-i}\phi)))))$$
$$= \max_{i \in t \oplus I}\left(\min\left(\rho^G(s, t_i, \psi), \min_{i' \in [0,i]} \rho(s, t_{i'}, \phi)\right)\right)$$
$$= \rho(s, t, \phi U_I \psi)$$

By using $\tau^G$ (s, $t_{-i}$, φ) instead of $\rho^G$(s, $t_{-i}$, φ) the robustness trace (up to time $t_i$) for $\rho^G$ (s, t, φ$U_I$ψ) may be found.

Thus, it may be shown that G can compute a valid robustness trace for any STL formula. In particular, the computation complexity of G can be seen to scale linearly with the length of the signal, or quadratically for the Until and Then operations, and also linearly as more temporal operations (i.e., tree depth of PT) are applied.

As detailed herein, a computation graph may be used to compute the robustness of a STL formula exactly. Taking gradients, however, with respect to pSTL parameters may be difficult due to the non-smooth nature of the max and min functions. By making a smooth approximation, a general computation graph library may be used to take the gradient with respect to a parameter using backpropagation.

Figure 6:
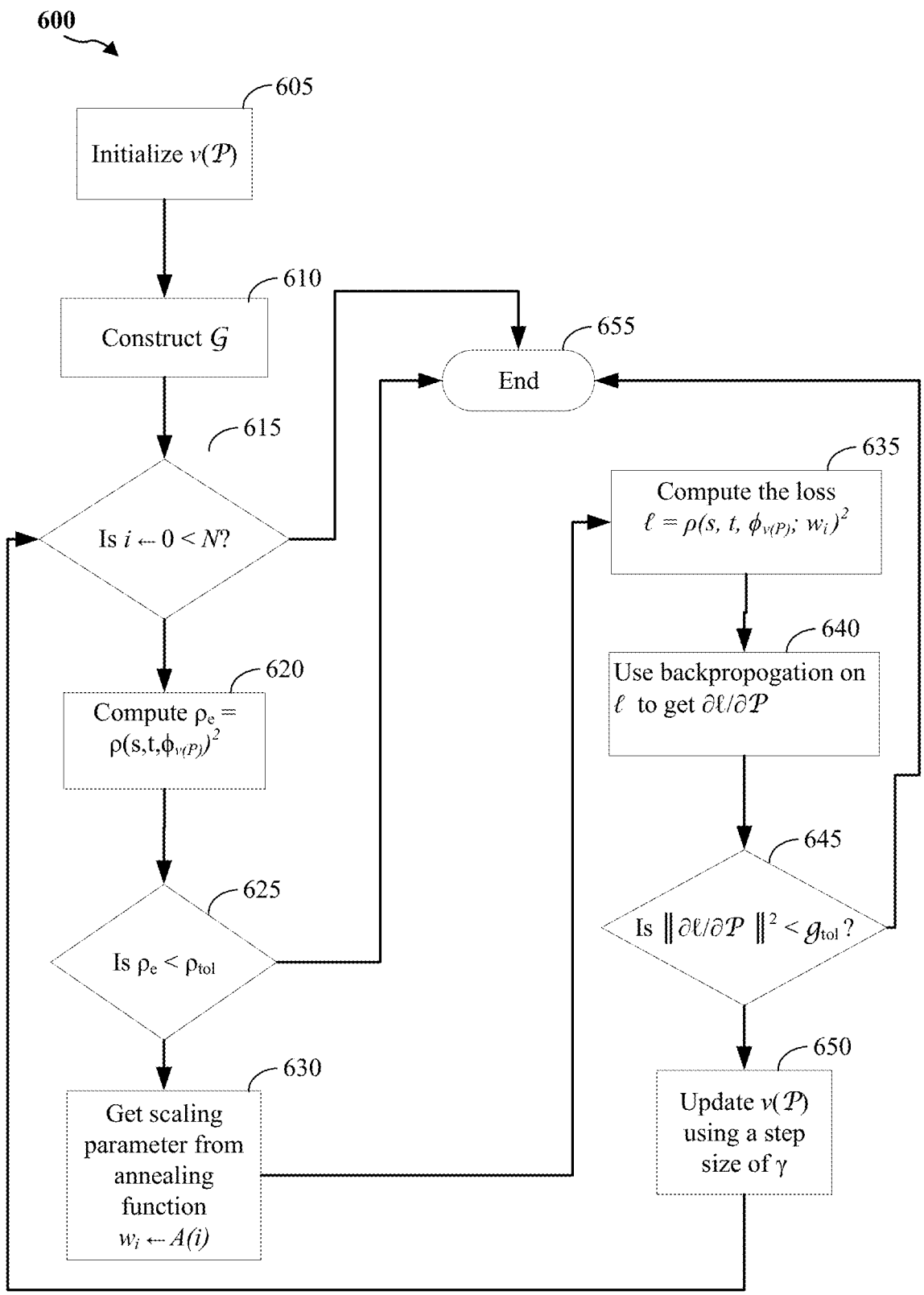
FIG. 6 depicts a flow diagram of a method of solving a parametric signal temporal logic using a computational graph and a differentiable approximation according to an aspect of the present disclosure.

FIG. 6 depicts an illustrative method for solving for pSTL parameters of Eq. (1), above, using a computation graph, G and differentiable approximations. The method of FIG. 6 may be a gradient descent algorithm, where the termination criteria depends on the true value of p and the gradient, and the relaxation parameter, w, is annealed over each iteration such that towards the end of the optimization process, the approximation of the max and min functions are more exact.

The illustrative method may take a timed trace s, pSTL formula $\phi_P$, a maximum number of iterations N, a robustness tolerance $\rho_{tol}$, a gradient tolerance $g_{tol}$, an annealing function A, and a learning rate γ as inputs. The method 600 may output the valuation v(P). As shown in block 605 the method may begin by initializing the valuation v(P), followed by constructing the computation graph G, as shown in block 610 and described above. As shown in block 615, a "for" loop may be implemented such that for every i←0 up to a maximum N, $\rho_e = \rho(s, t, \phi_{v(P)})^2$ is computed, as shown in block 620. If i←0 is greater than N, the method may terminate, as shown in block 655. As shown in block 625, the method 600 may determine if $\rho_e < \rho_{tol}$. If $\rho_e < \rho_{tot}$ (i.e., $\rho_e$ is less than a robustness tolerance), the method 600 may terminate. If $\rho_e$ is greater than the robustness tolerance, $\rho_{tol}$, as shown in block 630, a scaling parameter may be determined from the annealing function $w_i \leftarrow A(i)$. As shown in block 635, a loss value may be determined as $\ell = \rho(s, t, \phi_{v(P)}; w_i)^2$. Backpropogation may be used on l, as shown in block 640 to determine the differentiation, $$\frac{\partial \ell}{\partial P}.$$

As shown in block 645, if $$\left\|\frac{\partial \ell}{\partial P}\right\|^2 < g_{tol},$$

the method 600 may terminate. If $$\left\|\frac{\partial \ell}{\partial P}\right\|^2 \geq g_{tol},$$

v(P) may be updated using a step size of γ (the learning rate), as shown in block 650 and the method 600 may return to block 615.

According to one aspect of the disclosure, machine-learning software may be implemented. Advantageously, the gradients may therefore be computed by using an auto-differentiation functionality. The method shown in FIG. 6 demonstrates how we can iteratively tighten the approximation to obtain better and better precision. The illustrative method of may solve Eq. (1) more efficiently than other known methods, such as direct methods and gradient descent via finite differencing.

According to one aspect of the disclosure, depending on the application and assumptions made herein, absolute exactness of the parameters is not strictly necessary. For example, when pSTL is used for feature extraction, rather than for formal verification and/or model checking, post-analysis methods such as clustering or regression have inherent noise assumptions which can be accounted for by the inexactness. Thus, using differentiable approximations (i.e., computing the gradient of a computation with respect to its input variables) of the min and max operators in order may be used to make solving Eq. (1), above, more tractable. This differentiable approximation, when coupled with the computation graph representation G may offer the following benefits:

(1) backpropagation may be used to compute gradients, thus Eq. (1) can be solved efficiently;

(2) a smooth differentiable approximation may improve convergence for more complicated pSTL formulas;

(3) the benefits of modern machine learning tools, such as state-of-the-art auto-differentiation tools, may be leveraged. For example, optimization toolkits may be used, parallel hardware may be implemented, and multiple signals may be evaluated via hatching.

Such an approximation technique may be applicable to spatial parameters, and may not apply to temporal parameters (i.e., it may not apply to parameters that define the interval I).

Let $x \in \mathbb{R}^n$ and $w \in \mathbb{R}_{\geq 0}$, then the max and min approximations are:

$$\widetilde{max}(x; w) = \frac{\sum_i^n x_i \exp(wx_i)}{\sum_j^n \exp(wx_i)}, \quad \text{Eq. (2)}$$

$$\widetilde{min}(x; w) = \frac{\sum_i^n x_i \exp(-wx_i)}{\sum_j^n \exp(-wx_i)} \quad \text{Eq. (3)}$$

w is a scaling parameter, and when w→∞, this approximation may approach the true maximum or minimum, while w=0 gives the average of the values in x. Alternate approaches may exist because this approximation becomes ill-defined when w→∞, however, w may be restricted from getting too large (this parameter can be annealed) and thus ensure that x is scaled appropriately.

For every max and min operation in the robustness formula, it may be replaced by $\widetilde{max}$ (Eq. (2)) and $\widetilde{min}$ (Eq. (3)) As Eq (2) and Eq. (3) use elementary operations, it may be converted into a computation graph. As such, ρ(s, t, φ, w) may be written to indicate that the robustness is computed using the approximation parameterized by w.

According to one aspect of the present disclosure, the methods described herein may be applied to systematic scenario generation for autonomous driving, such as a traffic-weaving scenario. In order to certify the safety of a cyber-physical system, such as an autonomous vehicle, the system must be strenuously stress-tested in a diverse range of scenarios to ensure the system is certifiably safe and robust (i.e., that system failures occur within some ε-probability). For instance, autonomous vehicles must be tested for millions of miles on diverse scenarios. Even with simulation, such testing may be impractical and may hinder the development of the technology. For this reason, when developing a test suite for cyber-physical systems, it is important to have a strong understanding of the factors that make a testing scenario easy or difficult to pass.

While it is possible to generate test cases from simulation or real-world test data where a failure occurred, it may be more valuable to use the data to inform the search for unseen scenarios that may stress the system in different ways. Given a large dataset, however, it may be difficult to find structure and explainability in the data. Given a dataset of vehicles operating on the road, it may be difficult in general to cluster time-series data, but even more difficult to explain the behavior of a vehicle, such as "the car would turn left only if there was a sufficiently large gap." A designer may have a vague intuition of which quantities are important to monitor throughout the task, but may not have a strong grasp of how exactly those quantities interact with each other to produce interesting test cases.

According to one aspect of the disclosure, the problem of generating test cases for an autonomous vehicle in a traffic weaving setting may be considered. Such a scenario may be a challenging task in which two vehicles must change or swap lanes in a short amount of time, emulating a highway on/off ramp. One aspect of the present disclosure aims to use pSTL formulas to identify factors that contribute to making traffic-weaving challenging, and useful in designing challenging driving scenarios.

Figure 7:
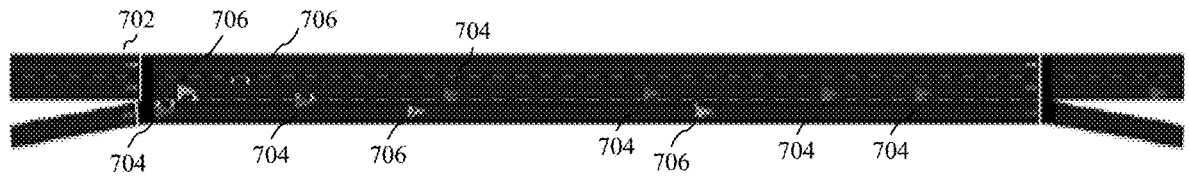
FIG. 7 depicts a graphical representation of a traffic weaving scenario according to an aspect of the present disclosure.

FIG. 7 depicts a graphical representation of a traffic weaving scenario. In such a scenario, two cars must swap lanes in a short amount of time, emulating a highway on/off-ramp, for example. As shown, the merging car, or ego car, 704 may be attempting to merge onto the roadway 702, the continuing cars 706 may stay on the roadway and be used to populate the road network. The aim, according to one aspect, is to generate driving scenarios with varying difficult levels in order to develop a suite of regression tests that track the progress of the autonomous driving stack.

According to an aspect of the present disclosure, pSTL may be used to learn "explanatory factors" in order to gain insight into why a driving scenario may be challenging. The knowledge of these factors may be leveraged create a variety of driving scenarios with varying difficulty to stress-test an autonomous driving stack.

According to one aspect, a "time to collision" (ttc), (the estimated time between an event occurring and a potential collision of the vehicle) may be determined to be an important quantity to monitor while the vehicle executes a lane change. Ttc may be defined as:

$$ttc(x_1, x_2, v_1, v_2) = -\frac{x_1 - x_2}{v_1 - v_2} \qquad \text{Eq. (4)}$$

Here, $x_i$ and $v_i$ represent the longitudinal distance and velocity of a vehicle i, assuming both vehicles are traveling almost parallel. While human intuition may propose ttc as an interesting quantity to monitor, aspects of the present disclosure seek to systematically quantify how ttc actually affects the difficulty of the scenario. As such, the following pSTL, formula is proposed:

$$\phi = \Diamond \Box_{[0,\tau]}(\Delta y < 3 \wedge ttc > \gamma) \qquad \text{Eq. (5)}$$

where $\Delta y$ is the lateral distance between an ego vehicle and another other vehicle. This formula, Eq. (5), may be translated as "eventually, when the ego car 704, is starting to move over to the adjacent lane over an interval of $\tau$ seconds, the ttc with the adjacent continuing car 706 should be larger than $\gamma$." The distance between the ego vehicle 704 and the continuing vehicle 706 may be chosen to be greater than three ($\Delta y < 3$) because the width of an average car is slightly less than three meters. The parameters to be learned are $\tau$ and $\gamma$. Since $\tau$ represents the length of the lane-change maneuver (when $\Delta y < 3$), $\tau$ may be computed from obtained data. Thus, it remains to find $\gamma$ using the computation graph method outlined above. That is, given a dataset D, for each trial $s^{(i)} \in D$, the pSTL equation, Eq. (1), may be solved using the computation graph method presented herein to obtain $\{\tau^{(i)}\}_{i=1}^n$ and $\{\gamma^{(i)}\}_{i=1}^n$.

Figure 8A:
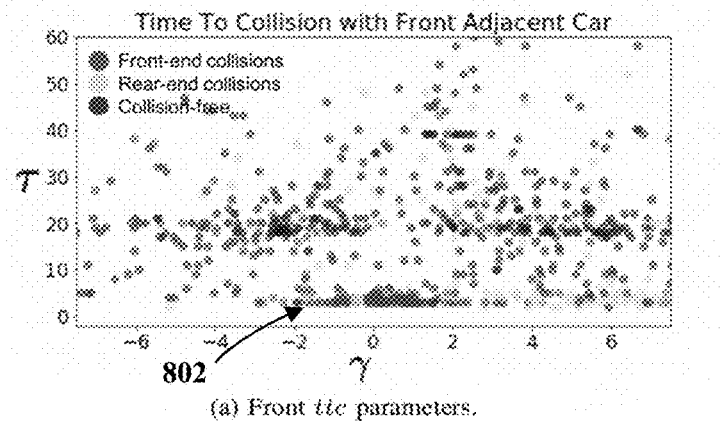
FIG. 8(a)-(b) depict results of a time to collision simulation according to one aspect of the present disclosure.
Figure 8B:
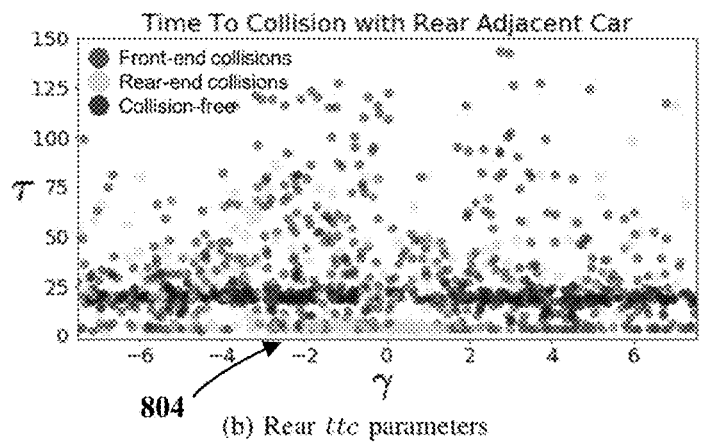

According to one aspect, roughly 3000 traffic-weaving trials may be generated using a road traffic simulation ckage, for example, the Simulation of Urban Mobility (SUMO). The simulation package may include a car-following and lane-changing model, as represented in the snapshot of FIG. 7. The formula may be applied to the front adjacent and rear adjacent cars of the ego vehicle. The adjacent side is defined as the side that the ego vehicle is attempting to change into. The results for $\tau^{(i)}$ and $\gamma^{(i)}$ in both front and rear cases are shown in FIGS. 8(a)-(b). Two cars are in collision if their distance from each other is within some tolerance. It may be seen that there is a distinct range 802 (FIG. 8(a)) for $\gamma$ that relates to front-end collisions $\gamma \in [-2, 2]$) and similarly, there is also a range 804 (FIG. 8(b)) that relates to rear-end collisions $\gamma \in [-4, 2]$). These ranges correspond to small $\tau$. This may indicate that when cars are changing lanes rapidly and have ttc within some threshold, those vehicles are more prone to collisions. There does not seem to be any relationship, however, when $\tau$ is larger, corresponding to a longer lane change.

These parameter bounds may be leveraged to design other vehicles on the road to be more adversarial and hence "stresstest" the ego-car's driving policy and accelerate the evaluation of an autonomous vehicle. For example, one can design a car that purposely drives to keep ttc below some threshold.

Aspects of the methods described herein show how parameters of logical formulas can be trained with machine learning tools. The systems and methods described herein embed logical structure into machine learning models.

Figure 9:
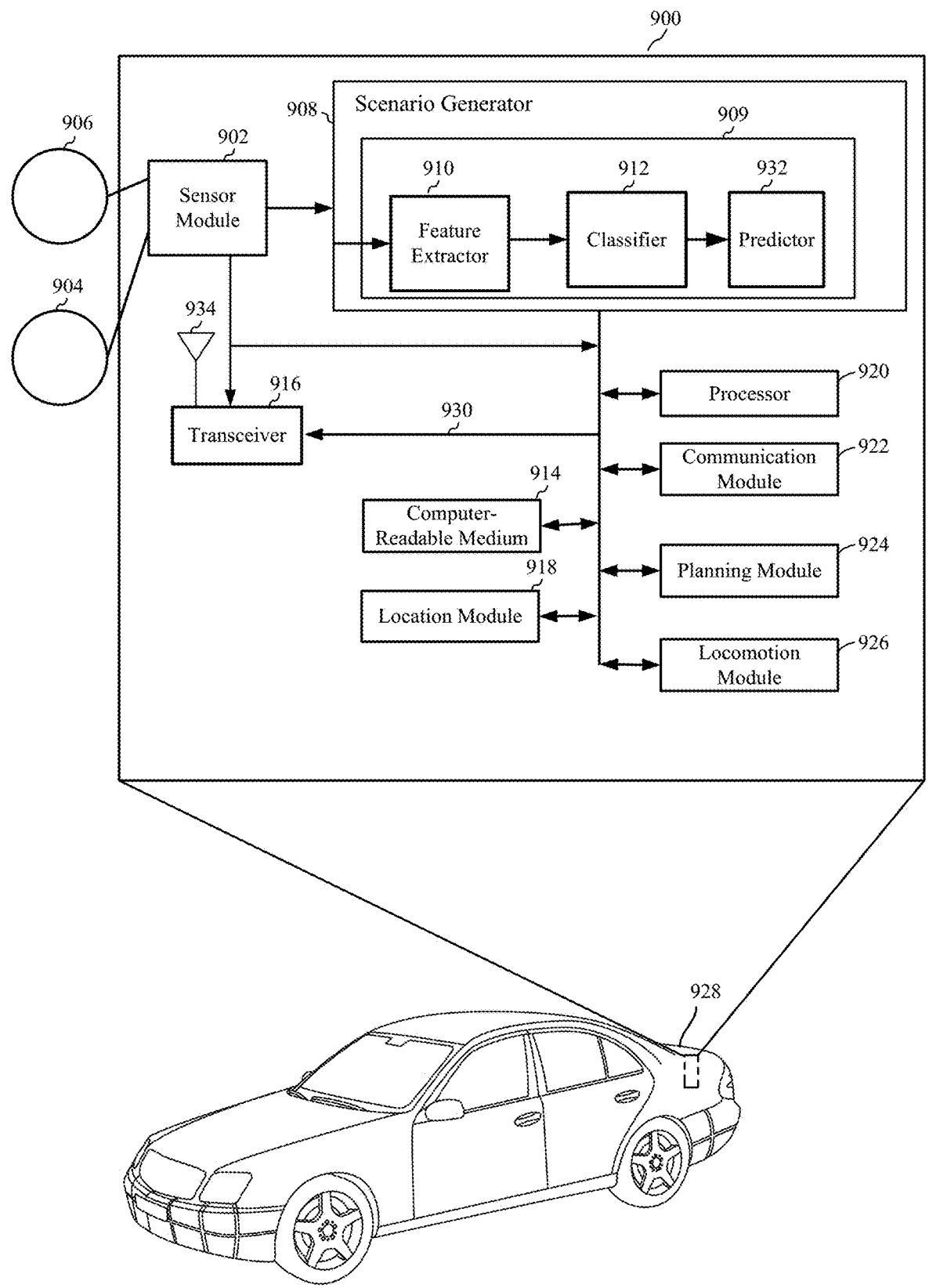
FIG. 9 depicts a hardware implementation for a systematic testing system according to aspects of the present disclosure.

FIG. 9 is a diagram illustrating an example of a hardware implementation for a driving scenario generation system 900 according to aspects of the present disclosure. The scenario generation system 900 may be a component of a simulator or other testing environment, a vehicle, a robotic device, or other device. For example, as shown in FIG. 9, the scenario generation system 900 is a component of a car 928. Of course, aspects of the present disclosure are not limited to the scenario generation system 900 being a component of the car 928, as other devices, such as a simulator, bus, boat, drone, or robot, are also contemplated for using the scenario generation system 900.

The scenario generation system 900 may be implemented with a bus architecture, represented generally by a bus 930. The bus 930 may include any number of interconnecting buses and bridges depending on the specific application of the scenario generation system 900 and the overall design constraints. The bus 930 links together various circuits including one or more processors and/or hardware modules, represented by a processor 920, a communication module 922, a location module 918, a sensor module 902, a locomotion module 926, a planning module 924, and a computer-readable medium 914. The bus 930 may also link various other circuits such as timing sources, peripherals, voltage regulators, and power management circuits, which are well known in the art, and therefore, will not be described any further.

The scenario generation system 900 includes a transceiver 916 coupled to the processor 920, the sensor module 902, a scenario generator 908, the communication module 922, the location module 918, the locomotion module 926, the planning module 924, and the computer-readable medium 914. The transceiver 916 is coupled to antennae 934. The transceiver 916 communicates with various other devices over a transmission medium. For example, the transceiver 916 may receive commands via transmissions from a user or a remote device. As another example, the transceiver 916 may transmit driving statistics and information from the scenario generator 908 to a server (not shown).

The scenario generation system 900 includes the processor 920 coupled to the computer-readable medium 914. The processor 920 performs processing, including the execution of software stored on the computer-readable medium 914 providing functionality according to the disclosure. The software, when executed by the processor 920, causes the scenario generation system 900 to perform the various functions described for a particular device, such as the car 928, or any of the modules 902, 908, 914, 916, 918, 920, 922, 924, 926. The computer-readable medium 914 may also be used for storing data that is manipulated by the processor 920 when executing the software.

The sensor module 902 may be used to obtain measurements via different sensors, such as a first sensor 906 and a second sensor 904. The first sensor 906 may be a vision sensor, such as a stereoscopic camera or an RGB camera, for capturing 2D images. The second sensor 904 may be a ranging sensor, such as a light detection and ranging (LI- DAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 904, 906. The measurements of the first sensor 906 and the second sensor 904 may be processed by one or more of the processor 920, the sensor module 902, the artificial neural network module 908, the communication module 922, the location module 918, the locomotion module 926, the planning module 924, in conjunction with the computer-readable medium 914 to implement the functionality described herein.

As previously discussed, the measurements from the first sensor 906 may be used to capture 2D images. Furthermore, the measurements from the second sensor 904 may be used for depth measurements. In one configuration, the data captured by the first sensor 906 and the second sensor 904 may be transmitted to an external device via the transceiver 916. The first sensor 906 and the second sensor 904 may be coupled to the car 928 or may be in communication with the car 928.

The location module 918 may be used to determine a location of the car 928. For example, the location module 918 may use a global positioning system (GPS) to determine the location of the car 928. The communication module 922 may be used to facilitate communications via the transceiver 916. For example, the communication module 922 may be configured to provide communication capabilities via different wireless protocols, such as WiFi, long term evolution (LTE), 3G, etc. The communication module 922 may also be used to communicate with other components of the car 928 that are not modules of the scenario generation system 900.

The locomotion module 926 may be used to facilitate locomotion of the car 928. As an example, the locomotion module 926 may control movement of the wheels. As another example, the locomotion module 926 may be in communication with a power source of the car 928, such as an engine or batteries. Of course, aspects of the present disclosure are not limited to providing locomotion via wheels and are contemplated for other types of components for providing locomotion, such as propellers, treads, fins, and/or jet engines.

The scenario generation system 900 also includes a planning module 924 for planning a trajectory or controlling the locomotion of the car 928, via the locomotion module 926, based on the analysis performed by the artificial neural network 908. In one configuration, the planning module 924 overrides the user input when the user input is expected (e.g., predicted) to cause a collision. The modules may be software modules running in the processor 920, resident/stored in the computer-readable medium 914, one or more hardware modules coupled to the processor 920, or some combination thereof.

The scenario generator 908 may be in communication with the sensor module 902, the transceiver 916, the processor 920, the communication module 922, the location module 918, the locomotion module 926, the planning module 924, and the computer-readable medium 914. In one configuration, the scenario generator 908 receives sensor data from the sensor module 902. The sensor module 902 may receive the sensor data from the first sensor 906 and the second sensor 904. According to aspects of the disclosure, the sensor module 902 may filter the data to remove noise, encode the data, decode the data, merge the data, extract frames, or perform other functions. In an alternate configuration, the scenario generator 908 may receive sensor data directly from the first sensor 906 and the second sensor 904.

The scenario generator 908 may define or receive one or more pSTL formula describing an operation, event, or action of the vehicle. The pSTL formulas may include one or more parameters to be learned. The scenario generator 908 may calculate or otherwise determine the pSTL parameters by using the backpropagation and computation graphs, as described herein. The parameters, pSTL formulas may be used to generate stress testing scenarios and incorporated into autonomous vehicle driving behaviors.

As shown in FIG. 9, the scenario generator 908 may include an artificial neural network 909 (e.g., machine learning module) may include a feature extractor 910, a classifier 912, and a predictor 932. The feature extractor 910, the classifier 912, and the predictor 932 may be components of a same or different convolutional neural network (CNN), such as a deep CNN. The artificial neural network 908 is not limited to a CNN and may be another type of artificial neural network, such as a support vector machine (SVM). The feature extractor 910 receives a data stream from a data source, such as the first sensor 906 and the second sensor 904, or a data storage device (not shown). The data stream may be data combined from the first sensor 906 and the second sensor 904. For example, the data stream may be a 2D RGB image from the first sensor 906 that is merged with LIDAR data points from the second sensor 904. In another configuration, the data stream is a separate stream from each sensor 904, 906. The data stream may include streams such as timed traces. The feature extractor 910 extracts (e.g., identifies) parameters of the data stream. The artificial neural network 908 may include one or more feature extractors 910. For example, one feature extractor 910 may be a parameter identifier of a pSTL formula as detailed above.

The predictor 932 may receive the output from the classifier 912 to predict a behavior of an observed agent, such as a time to collision of a merging vehicle, or other behavioral action. The prediction may be based on training. Additionally, the prediction may be based on classified time traces and determined robustness degrees and values. Based on the predicted behavior, the predictor 932 may also estimate a set of behavioral constraints of the agent. In another configuration, the artificial neural network 908 may output the predicted behavior determined by the predictor 932 to one or more of the sensor module 902, the transceiver 916, the processor 920, the communication module 922, the location module 918, the locomotion module 926, the planning module 924, and the computer-readable medium 914.

For example, the annotated data may output to the processor 920 to retrieve a set of behavioral constraints that correspond to the predicted behavior from the computer-readable medium 914 or planning module 924. Additionally, based on the set of behavioral constraints for the agent, one or more of the modules 902, 908, 914, 916, 918, 920, 922, 924, 926 may determine or update a set of behavioral constraints of the car 928. The planning module 924 may perform motion planning, decision-making, or other vehicular control functionality based on the set of behavioral constraints of the car 928.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A computer-implemented method for testing a behavior of an autonomous vehicle, the method comprising:
   receiving a timed trace signal associated with a behavior of a first vehicle in a first driving scenario;
   generating a non-monotonic parametric signal temporal logic formula associated with the first driving scenario;
   reversing the timed trace signal;
   generating a computation graph from the non-monotonic parametric signal temporal logic formula and the reversed timed trace signal;
   determining a robustness trace of the non-monotonic parametric signal temporal logic formula based on reversing an output of the computation graph;
   generating a differentiable approximation of one of a minimum or a maximum operator;
   iteratively solving the non-monotonic parametric signal temporal logic formula for at least one parameter using the differentiable approximation, the at least one parameter providing an optimal description of the timed trace signal;
   determining one or more explanatory factors of the behavior of the first vehicle in accordance with iteratively solving the non-monotonic parametric signal temporal logic formula;
   generating a group of driving scenarios, for the autonomous vehicle, in accordance with determining the one or more explanatory factors, each driving scenario of the group of driving scenarios associated with a respective difficulty level of a group of difficulty levels; and
   testing, via a group of regression tests, a respective behavior of the autonomous vehicle in each one of the group of driving scenarios.

2. The method of claim 1, wherein generating the differentiable approximation comprises using backpropagation to compute a gradient of the non-monotonic parametric signal temporal logic formula.

3. The method of claim 1, further comprising determining a robustness degree from the robustness trace, wherein the robustness degree is associated with quantification of the timed trace signal satisfying the non-monotonic parametric signal temporal logic formula.

4. The method of claim 3, wherein the robustness degree is a first element of the robustness trace.

5. The method of claim 1, further comprising optimizing the robustness trace using a machine learning model for feature extraction.

6. The method of claim 1, wherein the robustness trace comprises a robustness value of the timed trace signal.

7. The method of claim 1, further comprising generating one or more regression test cases for the autonomous vehicle.

8. The method of claim 7, wherein the first driving scenario is a lane-changing operation.

9. The method of claim 8, wherein the lane-changing operation comprises a time-to-collision value.

10. The method of claim 9, wherein the non-monotonic parametric signal temporal logic formula includes a time-to-change-lane internal parameter and a parameter.

11. The method of claim 1, further comprising generating a driving policy for the autonomous vehicle based on testing the respective behavior of the autonomous vehicle.

12. A system for a testing a behavior of an autonomous vehicle, the system comprising:
   a memory; and
   at least one processor coupled to the memory, the at least one processor configured:
      receive a timed trace signal associated with the behavior of the autonomous vehicle in a first driving scenario;
      generate a non-monotonic parametric signal temporal logic formula associated with the first driving scenario;
      reverse the timed trace signal;
      generate a computation graph from the non-monotonic parametric signal temporal logic formula and the reversed timed trace signal;
      determine a robustness trace of the non-monotonic parametric signal temporal logic formula based on reversing an output of the computation graph;
      generate a differentiable approximation of a minimum or a maximum operator;
      iteratively solve the non-monotonic parametric signal temporal logic formula for at least one parameter using the differentiable approximation, the at least one parameter providing an optimal description of the timed trace signal;
      determine one or more explanatory factors of the behavior of the autonomous vehicle in accordance with iteratively solving the non-monotonic parametric signal temporal logic formula;
      generate a group of driving scenarios, for the autonomous vehicle, in accordance with determining the one or more explanatory factors, each driving scenario of the group of driving scenarios associated with a respective difficulty level of a group of difficulty levels; and test, via a group of regression tests, a respective behavior of the autonomous vehicle in each one of the group of driving scenarios.

13. The system of claim 12, wherein the processor is further configured to generate the differentiable approximation using backpropogation to compute a gradient of the non-monotonic parametric signal temporal logic formula.

14. The system of claim 12, wherein:
the processor is further configured to generate a robustness degree from the robustness trace; and
the robustness degree is associated with quantification of the timed trace signal satisfying the non-monotonic parametric signal temporal logic formula.

15. The system of claim 14, wherein the robustness degree is a first element of the robustness trace.

16. The system of claim 12, wherein the at least one processor is further configured to generate a driving policy for the autonomous vehicle based on testing the respective behavior of the autonomous vehicle.

17. A near-transitory computer-readable medium having program code recorded thereon for a testing a behavior of an autonomous vehicle, the program code executed by a processor and comprising:
program code to receive a timed trace signal associated with the behavior of the autonomous vehicle in a first driving scenario;
program code to generate a non-monotonic parametric signal temporal logic formula associated with the first driving scenario;
program code to reverse the timed trace signal;
program code to generate a computation graph from the non-monotonic parametric signal temporal logic formula and the reversed timed trace signal;
program code to determine a robustness trace of the non-monotonic parametric signal temporal logic formula based on reversing an output of the computation graph;
program code to generate a differentiable approximation of one of a minimum or a maximum operator;
program code to iteratively solve the non-monotonic parametric signal temporal logic formula for at least one parameter using the differentiable approximation, the at least one parameter providing an optimal description of the timed trace signal;
program code to determine one or more explanatory factors of the behavior of the autonomous vehicle in accordance with iteratively solving the non-monotonic parametric signal temporal logic formula; and
program code a group of driving scenarios, for the autonomous vehicle, in accordance with determining the one or more explanatory factors, each driving scenario of the group of driving scenarios associated with a respective difficulty level of a group of difficulty levels; and
program code to test, via a group of regression tests, a respective behavior of the autonomous vehicle in each one of the group of driving scenarios.

18. The non-transitory computer-readable medium of claim 17, wherein the program code further comprises program code to generate a driving policy for the autonomous vehicle based on testing the respective behavior of the autonomous vehicle.

* * * * *